United States Patent
Saint Georges et al.

(10) Patent No.: US 9,094,163 B2
(45) Date of Patent: Jul. 28, 2015

(54) ASSESSMENT AND CORRECTION OF TRANSMITTED DATA

(75) Inventors: Eric Saint Georges, Campbell, CA (US); Joseph Shiran, Palo Alto, CA (US); Scott Alan Young, Campbell, CA (US)

(73) Assignee: AOptix Technologies, Inc., Campbell, CA (US)

(*) Notice: Subject to any disclaimer, the term of this patent is extended or adjusted under 35 U.S.C. 154(b) by 201 days.

(21) Appl. No.: 13/596,835

(22) Filed: Aug. 28, 2012

(65) Prior Publication Data

US 2014/0068357 A1 Mar. 6, 2014

(51) Int. Cl.
*H04L 1/00* (2006.01)
*H04L 12/26* (2006.01)
*H04L 12/893* (2013.01)
(Continued)

(52) U.S. Cl.
CPC ............ *H04L 1/0045* (2013.01); *H04L 1/00* (2013.01); *H04L 1/1614* (2013.01); *H04L 1/1642* (2013.01); *H04L 1/1809* (2013.01); *H04L 12/189* (2013.01); *H04L 12/1881* (2013.01); *H04L 12/1886* (2013.01); *H04L 41/00* (2013.01); *H04L 43/0823* (2013.01); *H04L 43/16* (2013.01); *H04L 45/70* (2013.01); *H04L 47/122* (2013.01); *H04L 47/40* (2013.01); *H04L 69/40* (2013.01)

(58) Field of Classification Search
CPC ....... H04L 1/00; H04L 41/00; H04L 43/0823; H04L 43/16; H04L 47/40; H04L 69/40; H04L 12/1881; H04L 12/1886; H04L 12/189; H04L 1/1614; H04L 1/1642; H04L 1/1809; H04L 45/70; H04L 47/122; H04L 67/14; H04L 67/141; H04L 67/146; H04L 69/32; H04L 69/324; H04B 10/1121; H04B 10/1123; H04B 10/114; H04W 4/08; H04W 72/10; H04W 84/18
USPC ......... 714/704, 712, 821, 819, 751, 752, 799; 370/242, 245; 375/224–228, 316, 375/240.27, 295; 398/1, 9, 10, 16, 17, 398/22–25, 27, 18; 710/106; 340/3.43, 340/3.44, 7.44; 348/425.2
See application file for complete search history.

(56) References Cited

U.S. PATENT DOCUMENTS 6,072,897 A * 6/2000 Greenberg et al. ............ 382/144
6,473,419 B1 * 10/2002 Gray et al. ..................... 370/349

(Continued)

FOREIGN PATENT DOCUMENTS

WO WO 00/13376 A1 3/2000
WO WO2014035497 A1 * 5/2013 .............. H04L 29/02

OTHER PUBLICATIONS

PCT International Search Report and Written Opinion, PCT Application No. PCT/US2013/41288, Jan. 22, 2014, thirteen pages.

*Primary Examiner* — John J Tabone, Jr.
(74) *Attorney, Agent, or Firm* — Fenwick & West LLP (57) ABSTRACT

Methods and systems for improving the quality of transmitted data are described. Multiple distinct communication channels are used to transmit segments representing the same pre-transmission block of a data packet. Upon receipt of these segments, a system identifies differences between the segments for those segments that meet a quality threshold. The system selects one of segments for subsequent transmission or re-assembly into a data packet based on the prior performance of the communication channels used to transmit the segments.

18 Claims, 5 Drawing Sheets

(51) Int. Cl.
*H04L 12/24* (2006.01)
*H04L 12/18* (2006.01)
*H04L 1/16* (2006.01)
*H04L 1/18* (2006.01)
*H04L 12/803* (2013.01)
*H04L 12/721* (2013.01)
*H04L 29/14* (2006.01)

(56) References Cited

U.S. PATENT DOCUMENTS

| | | | |
|---|---|---|---|
| 6,687,239 B1* | 2/2004 | Koprivica | 370/341 |
| 6,990,059 B1* | 1/2006 | Anikhindi et al. | 370/208 |
| 7,103,065 B1* | 9/2006 | Quigley et al. | 370/465 |
| 7,257,371 B1* | 8/2007 | Bettinger et al. | 455/13.2 |
| 7,535,900 B2* | 5/2009 | Shenoi | 370/389 |
| 7,675,879 B1* | 3/2010 | Gregory et al. | 370/316 |
| 7,840,178 B2* | 11/2010 | Hellman | 455/3.02 |
| 7,855,948 B2* | 12/2010 | Anikhindi et al. | 370/208 |
| 7,940,714 B1* | 5/2011 | Bettinger et al. | 370/316 |
| 8,266,496 B2* | 9/2012 | Flynn et al. | 714/758 |
| 8,380,774 B2* | 2/2013 | Skaug | 708/323 |
| 8,401,462 B2* | 3/2013 | Hellman | 455/3.06 |
| 8,627,114 B2* | 1/2014 | Resch et al. | 713/193 |
| 8,638,712 B2* | 1/2014 | Gorokhov et al. | 370/320 |
| 8,693,363 B2* | 4/2014 | Ericson et al. | 370/252 |
| 8,694,662 B2* | 4/2014 | Wu et al. | 709/230 |
| 8,830,886 B2* | 9/2014 | Ekbatani et al. | 370/310 |
| 8,842,746 B2* | 9/2014 | Gladwin et al. | 375/259 |
| 2003/0235252 A1* | 12/2003 | Tellado et al. | 375/259 |
| 2004/0037566 A1* | 2/2004 | Willebrand et al. | 398/115 |
| 2004/0208120 A1* | 10/2004 | Shenoi | 370/229 |
| 2005/0265389 A1* | 12/2005 | Mangin et al. | 370/469 |
| 2006/0056283 A1* | 3/2006 | Anikhindi et al. | 370/208 |
| 2007/0014536 A1* | 1/2007 | Hellman | 386/94 |
| 2008/0049706 A1* | 2/2008 | Khandekar et al. | 370/342 |
| 2009/0016311 A1* | 1/2009 | Wu et al. | 370/342 |
| 2009/0016317 A1* | 1/2009 | Wu et al. | 370/347 |
| 2009/0019113 A1* | 1/2009 | Wu et al. | 709/204 |
| 2011/0206022 A1* | 8/2011 | Grewe et al. | 370/338 |
| 2012/0027134 A1* | 2/2012 | Gladwin et al. | 375/340 |
| 2012/0030437 A1* | 2/2012 | Resch et al. | 711/156 |
| 2012/0030736 A1* | 2/2012 | Resch et al. | 726/5 |
| 2012/0127881 A1* | 5/2012 | Wiley et al. | 370/252 |
| 2012/0308235 A1* | 12/2012 | Pusarla et al. | 398/79 |
| 2013/0121178 A1* | 5/2013 | Mainaud et al. | 370/252 |
| 2013/0121337 A1* | 5/2013 | Nguyen et al. | 370/392 |
| 2013/0148553 A1* | 6/2013 | Ekbatani et al. | 370/310 |
| 2013/0304711 A1* | 11/2013 | Resch | 707/690 |
| 2014/0036702 A1* | 2/2014 | Van Wyk et al. | 370/252 |
| 2014/0123244 A1* | 5/2014 | Resch et al. | 726/4 |
| 2014/0133467 A1* | 5/2014 | Gorokhov et al. | 370/335 |

* cited by examiner

ASSESSMENT AND CORRECTION OF TRANSMITTED DATA

BACKGROUND

This invention relates generally to data encoding and transmission. Specifically, this invention relates to methods and systems for the assessment and correction of transmitted data.

The transmission of data between distinct computing systems has become ubiquitous and is used for a variety of purposes, whether for personal communication from one entity to another, delivery of control signals to control the operation of computing systems, or other purposes. Facilitating the pervasive use of transmitted data has been the development of communication networks that can use one or more data transmission techniques, whether in series or parallel, to transmit data. For example, electronic signals can be received as an optically provided Ethernet packet, transformed into a wireless radio signal (e.g., 3 G or 4 G wireless signal), and further transformed into another type of wireless radio signal (e.g., LAN or WLAN). This ability to transform a signal between various signal types or protocols can facilitate the delivery of time-sensitive data to different types of devices at disparate locations, where each device may be accessible by one or more of a variety of data transmission techniques. As it is generally quite easy to convert signals between different formats, there is considerable interest in finding formats and transmission mechanisms that improve the speed and accuracy with which data may be transmitted.

SUMMARY

To improve the speed and accuracy with which data are received at an endpoint, embodiments of the present disclosure include mechanisms for transmitting data over multiple different communications channels, and for receiving and processing the received data in such a way as to maintain high transmission bit rates while also reducing the need for re-transmission.

In one implementation, a data packet to be transmitted is divided into segments. These segments are independent of any divisions that may have already been present in the data packets. Thus, the segments made out of the data packet include not only the data of the data packet, but also any error detection and/or correction coding that was already present in the data packet. The segments are then transmitted using multiple distinct transceivers using separate communication channels. As a consequence, multiple copies of each segment are sent, where each copy of the segment corresponds to the same portion of the original pre-transmission data.

These segments are received at another set of transceivers. The transceivers receiving the segments are configured to make use of the multiple copies (or versions) of the segment to determine which copy of the segment is the most accurate with respect to what was originally transmitted. In an ideal case, the data should be the same. However, often segments will be different upon receipt than they were when originally transmitted. Having determined which segment is most representative of the segment originally transmitted, the transceiver can then initiate follow up processing for that segment including, for example, queuing that segment for transmission to another transceiver, or reconstituting the original data packet.

To determine which segment is most representative of the original pre-transmission segment, the receiving transceiver evaluates each transmitted segment according to a quality threshold. For cases in which one of these segments meets the threshold and one does not, only the former is used for subsequent processing. The latter packet is discarded. Often, however, both copies of a transmitted segment may meet the quality threshold and yet may still have differences in the portion of the data packet they convey.

To determine which segment to use for further processing, the receiving transceiver is configured to evaluate the prior performance history of the communications channels used to transmit the segments. The segment that was transmitted by the communications channel with the best (i.e., most accurate) transmission history is selected for further processing. To determine this, a performance metric is determined for each communications channel. Factors contributing to the performance metric of a channel may include a power level of the transmitting channel as indicated by an error detection and/or an error correction code (e.g., a forward error correction code or CRC error code), and/or a prior error rate of the channel. The performance metric may be determined for a prior window of time, a specific number of prior segments, a particular quantity of data, or other similar metrics.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Wireless Communication Systems and Networks

Figure 1:
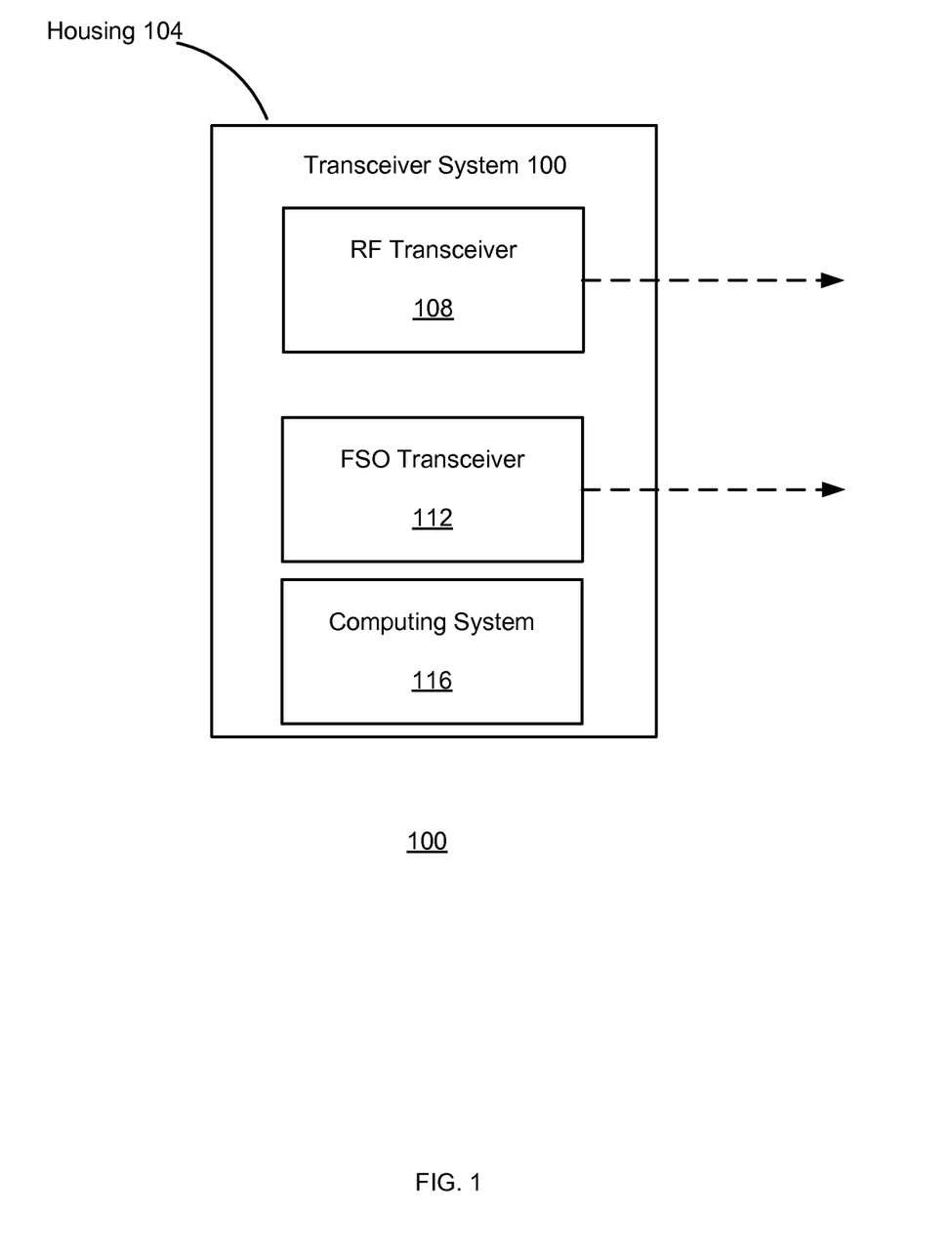
FIG. 1 is a block diagram of a transceiver system for exchanging information with other similar transceivers, in an embodiment.

FIG. 1 illustrates an example transceiver system 100 for exchanging information with other similar transceivers. In this example, the system 100 includes a housing 104, a radio frequency ("RF") transceiver 108, a free space optical ("FSO") transceiver 112, and a computing system 116.

The housing 104 provides protection against environmental deterioration or destruction for the internal electrical and mechanical components of the system 100. In one embodiment, the housing 104 includes one or more apertures for sending and receiving information. Each aperture is transparent to the transmissions of the transceiver it is associated with. In one embodiment, the housing 104 may also provide internal environmental control of temperature, humidity, and other similar factors. For example, the housing 104 may employ a heater to control temperature and an air conditioning unit to control temperature and humidity. With respect to the apertures, a heater, wiper, or another mechanism may be present to limit occlusion of the aperture.

Both the RF transceiver 108 and the FSO transceiver 112 are mounted on a moving platform (not shown) that is connected to an assembly (also not shown) that allows the transceivers to change their orientation within a range of motion on at least one axis in order to assist the transceivers in forming communication links with other similar transceivers. In one embodiment, the assembly is a gimbal assembly although other assemblies can be used to change the orientation of the transceivers. The moving platform, assembly, and other instrumentalities of the system 100 are described in more detail in U.S. patent application Ser. No. 13/149,804, titled "Integrated Commercial Communications Network Using Radio Frequency and Free Space Optical Data Communication," filed on May 31, 2011, and incorporated herein in its entirety.

The RF 108 and the FSO 112 transceivers are the physical devices used to transmit data signals between transceiver systems. The RF 108 and the FSO 112 transceivers are merely examples of communications channels that can be used to send the segments, and other types of communication channels may be used in other examples of the system 100. Generally the communications channels are distinct from each other in at least one way. For example, the FSO 112 and the RF 108 transceivers are distinct with respect to the wavelength of radiation used to transmit. Other distinctions between communications channels may include the physical location or spatial distance from another channel, the time of transmission, the encoding technique or multiplexing technique used, and/or bit rate used.

While, in this example, only the radio frequency transceiver 108 and the free space optical transceiver 112 are shown, other types of receivers and transceivers may be incorporated into the system 100, using different communication channels or frequencies, and/or more than two transceivers.

The housing 104 also contains the computing system 116 configured to communicate with the RF 108 and the FSO 112 transceivers to control the transmission, reception, and processing of data. The computing systems of some transceiver systems 100 are communicatively coupled with an external computing network comprising one or more external computers (not shown). These external computers can be both a source of packet data to be transmitted between transceiver systems, as well as a destination for packets of data that have been transmitted to a given transceiver system from another transceiver system.

The computing system is configured to process data that is sent or received. This includes converting packets of data into segments so that they may be sent to another transceiver, as well as processing received segments. These process are further described with respect to FIGS. 3-5 below. The computing system is also configured to exchange power with systems external to and separate from the system 100.

To exchange power and data with external systems, the computing system 116 may be attached to cables and/or fibers that pass through a port (not shown) in the housing 104. For example, the computing system 116 may be attached using power cables, to an external power system that provides power to the transceiver system 100 and the elements therein, including the transceivers 108, 112 and the computing system. As another example, the computing system 116 may be attached to the external computing network through an Ethernet cable.

Figure 2:
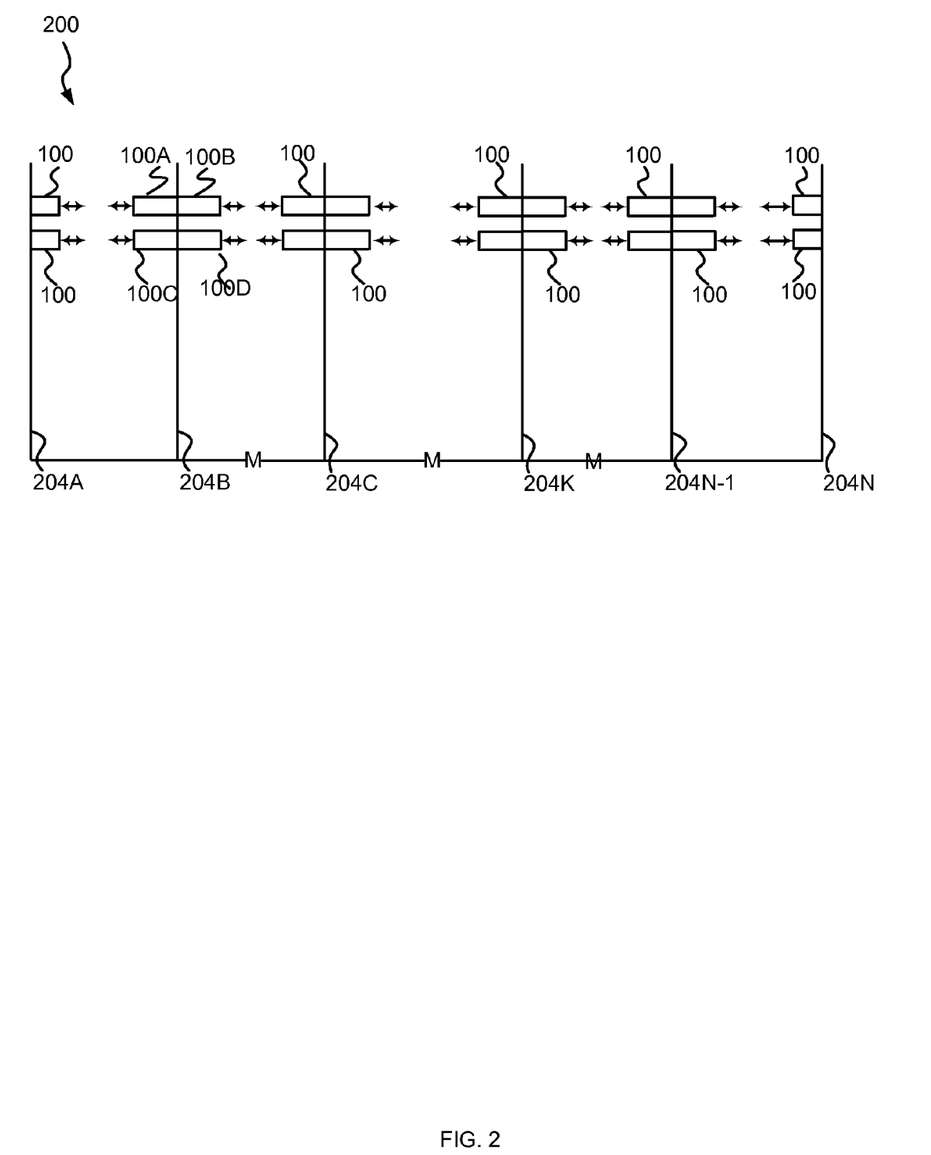
FIG. 2 is an illustration of a communication network using multiple transceivers, each having multiple communication channels, in an embodiment.

FIG. 2 illustrates an example communication network 200 in which multiple transceiver systems 100 are used to transmit data long distances using transceiver systems 100. In this example, the network 200 includes a plurality of communication stations 204A to 204N (collectively "204" for brevity), where N is any number. While the network 200 includes multiple transceiver systems, embodiments described below are equally applicable to networks having only two terminal transceiver systems (i.e., a "single hop" network).

Generally, each station 204 of the network 200 includes four transceiver systems 100. Two of the transceiver systems 100 are oriented in opposing directions, as illustrated by the systems 100A and 100B on the station 204B, in order to transmit and receive in two different directions. Two of the transceiver systems 100 are oriented in the same direction, as illustrated by the systems 100A and 100C on the station 204B, so as to communicate with corresponding transceiver systems 100 at the neighboring station 204.

Orienting two systems 100A and 100C (or 100B and 100D) in the same direction allows for near simultaneous transmission and reception of data signals from each of the transceivers in the pair. Further, because each transceiver system 100 includes more than one communication channel, each station 204 allows multiple layers of transmission duplication to help ensure that data is accurately and timely sent and received between stations. For example, the four systems 100 can be in linked in communication using one or more cables (not shown), thereby allowing a transmitted signal to be sent via the cable from one system to another in the event one of the transceivers is not functioning properly.

While most of the stations 204 (stations 204B to 204N-1) in the network 200 include four transceiver systems 100 as described above, the stations 204A and 204N at either end of the network ("terminal stations") have only two systems. As end points of the network 200, these terminal stations 204A and 204N transmit in only one direction. Rather than transmitting in a second direction, the terminal stations 204A and 204N are connected to external computing devices, as described above. The terminal stations 204A and 204N thus serve as the point of exchange for data switching between the communications network 200 and an external computing network.

While each example station 204 above is described as having either two or four systems 100, it will be appreciated that any number of the systems may be used at each station without departing from the concepts described herein. Further, while the example network 200 shown includes the stations 204A to 204N arranged in a single line, it will be appreciated that analogous networks may have branches extending in multiple directions from any station 204 in the network. In some implementations, only a single transceiver (e.g., the transceiver 108, 112, or other type of transceiver) per system 100 is used, and multiple copies of the same segment are transmitted at different points in time rather than on different communication channels.

Structure of a Segment

Figure 3:
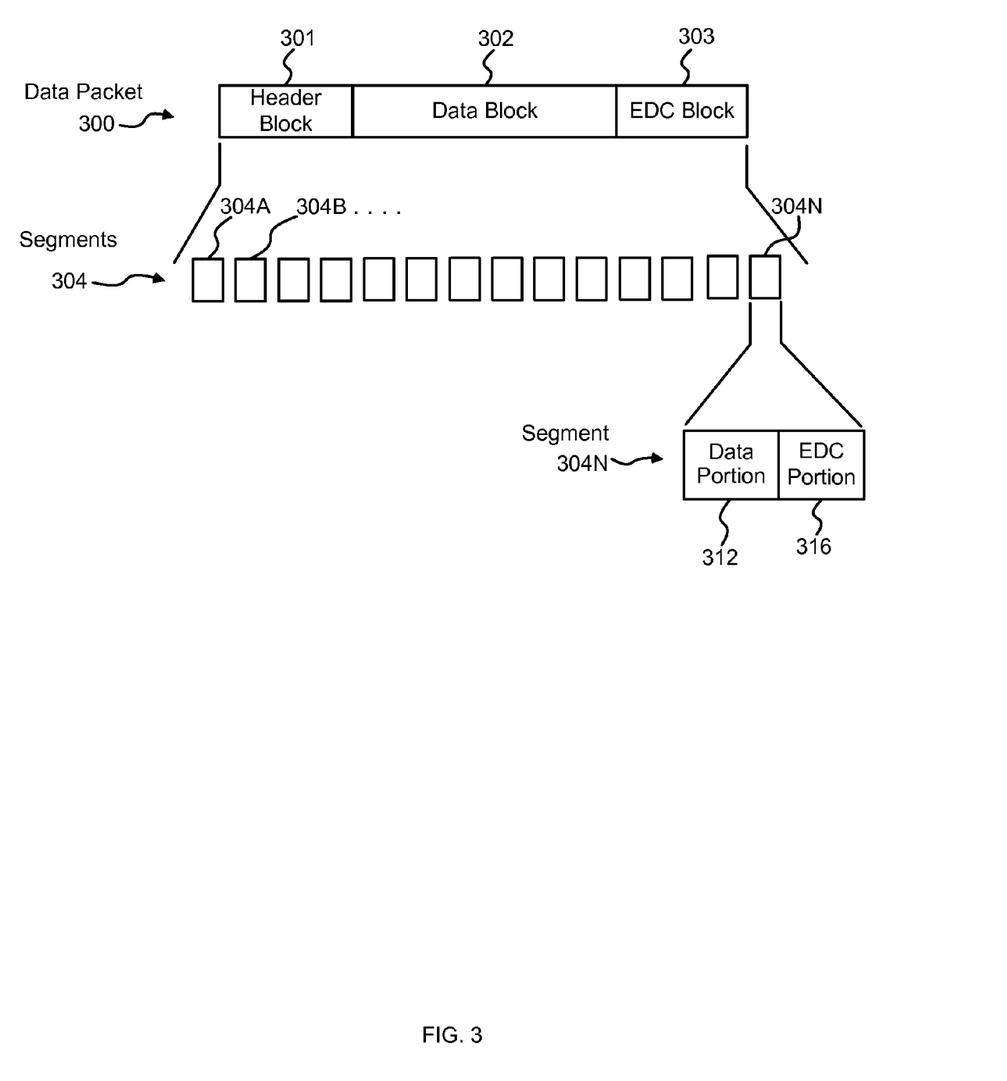
FIG. 3 is an illustration of the relationship between a data packet and a transmitted data segment, in an embodiment.

The transceiver system 100, as shown in FIG. 1, is used in the communication network 200, as shown in FIG. 2, to exchange data segments with other transceiver systems. The transceiver systems 100 exchange information in the form of segments, as shown in FIG. 3. Specifically, FIG. 3 illustrates the relationship between a data packet that may be received from an external computer or computing network (e.g., an Ethernet packet), the transmission segments exchanged between the transceiver systems 100, and the constituent portions of each segment. To communicate between the network 200 and external computing networks, the transceiver systems 100 are configured to convert data packets 300 to segments 304, and vice versa.

In the example shown, the data packet 300 includes a header block 301, a data block 302, and an error detection block 303 ("EDC"). In some cases, the error detection block 303 uses techniques such as cyclic redundancy check ("CRC") to identify errors in the transmitted data. In other examples, the EDC is (or includes) error correction coding ("ECC"). Some types of ECC include forward error correction ("FEC") which reduces the need to re-transmit data identified as erroneous. In further examples, other techniques are used to detect and/or correct errors.

The header block 301 is used to communicate control information or overhead information useful for the successful transmission of the data block 302 from a sender to a recipient. For example, the header block 301 may include the IP addresses of the sender and the recipient of the data, the Internet protocol used to format the data in the data block 302, packet sequencing information, and other information used to accomplish the transmission of the packet.

The data block 302 includes a string of bits corresponding to the information provided by the sender. That is, the data block 302 represents the information that the sender seeks to communicate by sending the message. This is in contrast to, for example, the data of the header block 301, which is used to identify and facilitate successful transmission of the data block 302.

The EDC block 303 includes error detecting data comprising bits that are redundant with the header block 301 and/or the data block 302, or otherwise includes bits that are used to detect errors in the transmitted data. Examples of error detection coding techniques include, but are not limited to cyclic redundancy checks, parity bits, repetition codes, and others. The EDC block 303 is used to detect and/or correct errors in the transmitted data. Error correction data reduces or removes the need to retransmit data that is incorrectly received. That is, errors in the transmitted data can be corrected without re-transmitting data. A benefit of this is that a reverse direction communication channel is generally not needed (or is only infrequently needed) to request re-transmission of data, and a forward direction communication channel is generally not needed (or, again, is only infrequently needed) to re-transmit the data responsive to the re-transmission request.

To facilitate transmission through the network 200, the data packet 300 is partitioned into a plurality N (N being one or more) of data portions 312, each used to create one segment 304. Each segment 304 includes a data portion 312 that includes at least some portion of data packet 300. For example, the data portion 312 may include bits of data from the header block 301, the data block 302, and/or the EDC block 303. The data packet 304 is broken up into more than three segments. The divisions between segments may fall entirely into one of the three blocks of the data packet 300, however it is also possible that a few segments will contain at least some data from more than one block of the data packet.

Each segment 304 also includes an EDC portion 316. This EDC portion 316 contains information separate from that contained in the EDC block 303 of the data packet 300. In creating each segment 304, the transceiver system 100 is configured to perform an error detection or error correction process to generate an EDC portion 316 for each segment. For example, if a particular segment encodes a portion of the EDC block 303 of the data packet 300, the EDC portion 316 for that segment will consist of EDC bits originating from the EDC block. Thus, the segments 304 transmitted for each data packet 300 contain two levels of error detection coding: error detection coding on a segment level, and also at a packet level. This dual-level EDC helps ensure that packet integrity is maintained despite transmission and/or re-transmission by numerous transceiver systems 100. As mentioned above, types of EDC can include both error correction and error detection coding, such as (but not limited to) FEC and CRC, respectively.

The transceiver systems 100 are also configured to reconstitute the original data packets 300 from the segments. As part of this process, the transceiver systems 100 are configured to process the EDC portion 316 of each segment to verify and correct the data portion 312 of each segment. The transceiver system 100 is further configured to reconstitute the data packet 300 from the received and decoded data portions 312 of the segments.

Although not illustrated, each segment may also include a header portion to facilitate the identification and proper transmission of the segments between the transceiver systems 100.

Figure 4:
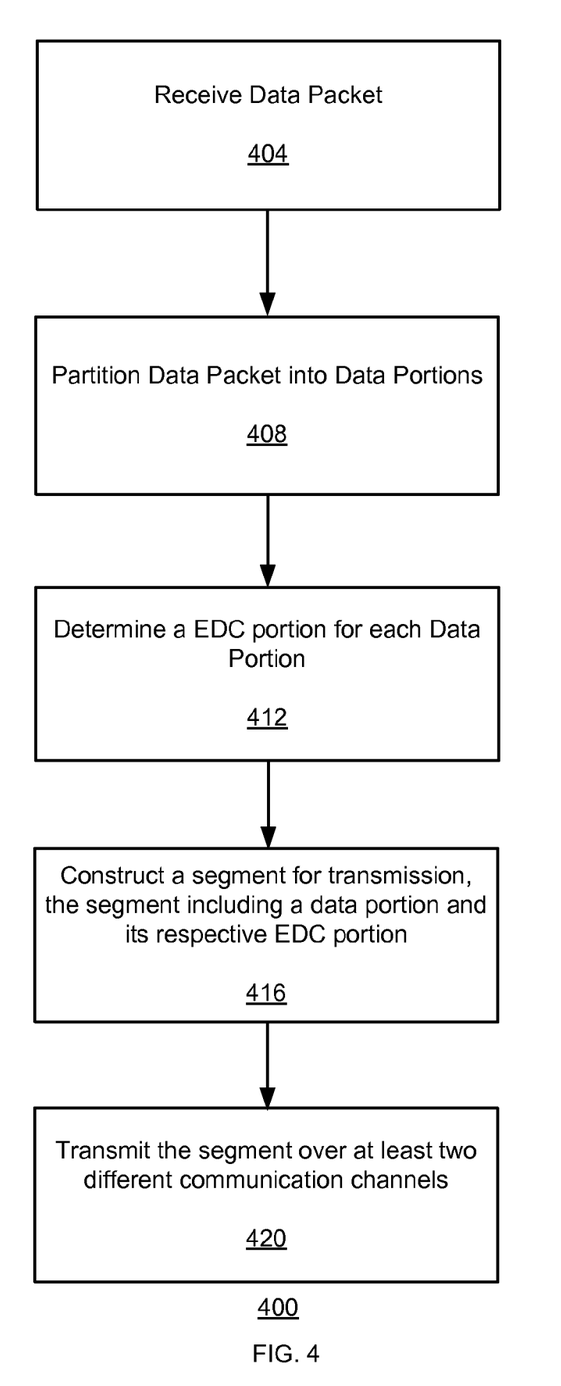
FIG. 4 is a method diagram of a process for creating and transmitting a data segment, in an embodiment.

FIG. 4 illustrates a method 400 of using a sending transceiver system to send one or more segments 304 to a receiving transceiver system. The sending system receives 404 a data packet to be transmitted. The data packet 300 is partitioned 408 into the data portions 312. The EDC portion 316 is determined 412 for each data portion 312 and appended to the data portion, thereby constructing 416 a segment 304. Each segment 304 to be transmitted is copied, such that each copy represents the same bits from the data packet 300. The copied segments are then transmitted 420 using the transceiver system 100. Specifically, each individual transceiver of the transceiver system 100 transmits a copy of the segments 304. In one embodiment, the RF transceiver 108 transmits a first copy of the segment, and the FSO transceiver 112 transmits a second copy of the segment.

Determining the Quality of the Segments

Error identification and error correction in the transmitted segments 304 is of particular importance in low latency networks (such as some embodiments of the network 200). Generally, the probability of incorrectly finding no error in the data portion (i.e., a "false positive") increases as the size of the EDC portion 316 decreases. Because the data portion 312 is generally reduced to reduce latency during transmission, resolving these errors is of particular interest for improving the performance of low latency networks.

The receiving transceiver system 100 is configured to receive the multiple copies of the segment. In some instances, loss of connection or other occurrences may cause one or more of the segments to be lost in transmission. In this case, re-transmission may be configured to occur when the connection is re-established. In the event that only a single segment is received, either that received segment may be used for further processing, or alternatively, retransmission may be requested, depending upon the embodiment.

Upon receipt, the receiving transceiver system 100 is configured to decode the EDC portion 316 of each segment and determine the number of errors (if any) in each segment. In this case, because error correction code is not used, the errors remain in the segment.

For cases in which the EDC contains error correcting code, the correcting code is decoded and the result applied to the data portion 312. As a consequence of this, some errors that may have been introduced into the segment during transmission are removed. However, often errors may remain even after the EDC portion 316 is used. While the size of the ECC portion 316 could be increased to remove more errors, this would come at the cost of increased segment size, which would typically increase latency.

Figure 5:
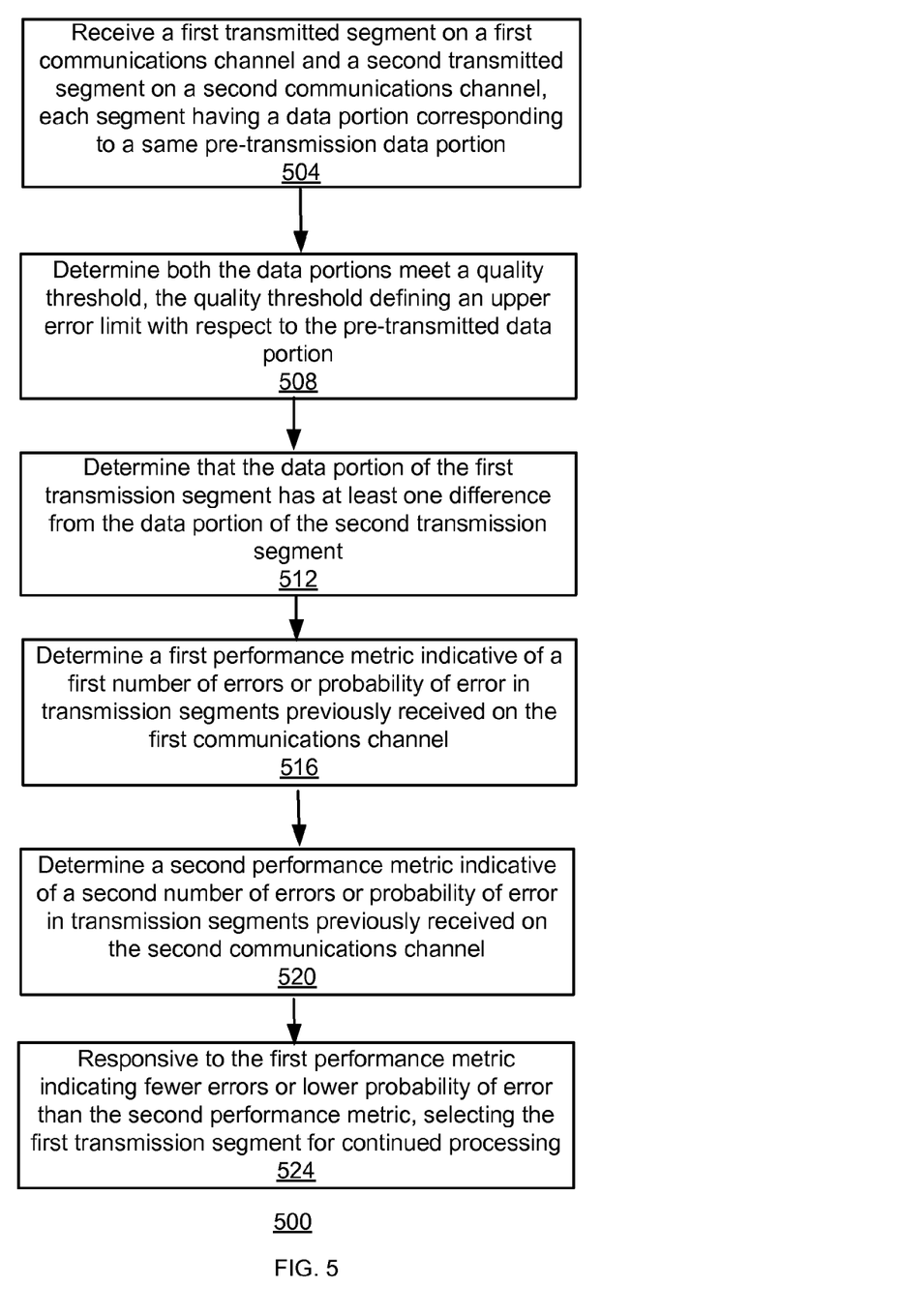
FIG. 5 is a method diagram of a process for receiving transmitted data segments from separate communication channels and selecting one of the data segments for continued processing, in an embodiment.

As shown by method 500 in FIG. 5, to address any remaining errors after EDC decoding, the segments 304 are evaluated to determine 508 whether the data portion 312 of each segment meets a quality threshold. Specifically, the EDC portions 316 of each segment are analyzed with respect to their respective data portions 312 to determine if the segment meets a quality threshold. In one implementation, the quality threshold is defined by an upper limit of an acceptable number of errors (which includes zero errors) present in the data portion 312 of each segment. Whether each segment meets this threshold can be determined by decoding the EDC portion 316 of the segment 304 to determine the number of errors in the data portion 312 of the segment. If the number of errors is less than the acceptable number of errors defined by the quality threshold, then the segment is considered to meet the quality threshold. Otherwise, the segment does not meet (or fails) the quality threshold. The acceptable number of errors can be zero, one, two, or more errors per data portion 312, and may be fixed or dynamic based on connection and/or transmission conditions.

For examples in which the EDC uses error correction coding, a segment can be evaluated against the quality threshold either before or after error correction. In one embodiment of this example, the segments are evaluated against the quality threshold prior to the error correction by selecting for further processing the segment having the fewest number of pre-correction errors. In another embodiment, the errors in each of the segments are corrected using the error correction coding and one segment is selected for further processing based on the post-correction differences between the two segments. In still another example, the quality threshold is not quantitative, but instead relative: that is, the segment selected is the one having the fewest errors regardless of the quantity of errors. This last example is useful for systems that are particularly tolerant of errors (e.g., video or audio streaming).

Given this evaluation of the segments in light of the quality threshold, there are three possible outcomes. First, if both of the segments 304 do not meet the quality threshold, both segments are discarded and re-transmission may be requested. Second, if both of the segments 304 meet the quality threshold and their data portions 312 are identical, either of the segments can be subsequently used for further processing. Third, if both of the segments 304 meet the quality threshold but are determined 512 to contain one or more differences in their respective data portions 312, both segments are analyzed to determine which segment is used for further processing. This third outcome is problematic because, the data portions 312 of each segment should be the same but are not. Because at least one of these differing segments 304 must contain an error (or a set of errors) undetected by the EDC, the receiving transceiver system 100 performs a further analysis to decide which segment should be selected for subsequent processing.

Selecting Between Acceptable but Different Segments

FIG. 5 further illustrates a method 500 for selecting one of the two segments 304, both of which meet a quality threshold, but include the data portions 312 that should be the same but are not. Upon execution of the method 500, the accuracy of data transmitted through the network 200 is improved by selecting the segment 304 more likely to accurately represent the data of the data packet 300 that the segment represents.

This selection process is based on the prior performance (or performance metric) of the communication channels used to transmit the transmission segments. This is because the channel that has, historically, transmitted segments more accurately and/or consistently has a higher probability of having transmitted the most recent segment accurately or more accurately.

A first performance metric is determined 516 for the first communication channel and a second performance metric is determined 520 for the second communication channel. In one implementation, the performance metric of a communication channel is based on a number of errors in previously received segments (that is, the number of errors in segments received before the current segment under consideration). The number of errors can be determined using any of a number of algorithms. In one example, a window is defined that dictates the scope of which previously received segments are under consideration for inclusion in the performance metric. The window can be defined using a time period, a number of received segments, a particular quantity of data, or any other quantity or characteristic of the communication channel that defines a period in which to evaluate the performance of the channel. The errors in the segments received within the window can then be counted to arrive at the performance metric of the channel.

In another embodiment, the performance metric may be based on the power level of the communications channel. Similarly to the case above, the power level may be determined for a previous window of time, where the window may be defined based on any of the factors listed above. The power level is useful for determining the performance metric because fluctuations in power away from a normal operating power generally cause the transceiver system 100 to suffer in performance, regardless of transceiver types. For example, if the power is too high, light detectors present in the RF 108 and the FSO 112 transceivers may be saturated, thus reducing the ability of the transceiver to accurately record incoming signal. In another example, if the power is too low, the signal to noise ratio of the transceivers may suffer. In addition to power level and error count, other quantities or system characteristics may be used to determine the performance metric for communications channels. Other examples of performance metrics include, but are not limited to, the number of errors detected in a set of previously received segments, the number of errors detected in the instantly received segments (i.e., the segments being processed and not those previously or subsequently received) or the number of segments having one or more errors (determined independently from the number of errors in each segment 304).

The performance metric may also be phrased in terms of a probability of error. That is, using any of the above described aspects (or combinations thereof), a probability of error can be calculated for the channel.

Once the performance metrics for both communication channels are determined, the segment that was received on the communication channel having a better performance metric (e.g., fewer errors, more stable power level) is selected for continued processing. As mentioned above, continued processing may include transmitting the selected data segment to another transceiver system 100 located on a station 204 of the network 200, or processing the segment for reassembly back into data packet 300 form.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations performed by modules, computing systems, networks, and other structures, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein. For example, the algorithms and processes may be implemented using a field programmable gate array (FPGA) or an application specific integrated circuit (ASIC). The FPGA may be programmed from a writeable media, whereas the ASIC uses logic circuits to execute the processes using (typically, but not exclusively), digital signals.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for receiving data, comprising:
   receiving a first segment on a first communication channel, the first segment comprising a first data portion;
   receiving a second segment on a second communication channel, the second segment comprising a second data portion, the second data portion being a copy of the first data portion made prior to transmission of the first data portion;
   determining that the first and second data portions both meet a quality threshold, the quality threshold comprising an upper error limit;
   responsive to determining that the first data portion has at least one difference from the second data portion:
      determining a first performance metric indicative of a first number of errors or a probability of error in segments previously received on the first communication channel;
      determining a second performance metric indicative of a second number of errors or a probability of error in segments previously received on the second communication channel; and
      responsive to the first performance metric indicating fewer errors than the second performance metric, selecting the first segment for continued processing.

2. The method of claim 1, wherein determining that the first and second data portions both meet the quality threshold comprises:
   decoding a first error detection code (EDC) portion of the first segment to determine a number of errors in the first data portion;
   determining that the number of errors in the first data portion is less than the quality threshold;
   decoding a second EDC portion of the second segment to determine a number of errors in the second data portion; and
   determining that the number of errors in the second data portion is less than the quality threshold.

3. The method of claim 2, wherein the quality threshold is zero errors.

4. The method of claim 2, wherein the quality threshold is a single error.

5. The method of claim 2, wherein the quality threshold is at least two errors.

6. The method of claim 1, wherein receiving the first segment on the first communication channel comprises using a radio frequency (RF) receiver or a Free Space Optical (FSO) receiver for the receiving, and receiving the second segment on the second communication channel includes using the other type of receiver for the receiving.

7. The method of claim 1, wherein determining each performance metric for a communications channel comprises:
   determining a time window comprising an amount of time prior to a present time;
   accessing a plurality of previous segments received on the communications channel during the time window, each of the plurality of previous segments including one or more errors;
   counting the errors from the plurality of previous segments received during the time window; and
   determining the performance metric based on the counted errors from the plurality of previous segments received during the time window.

8. The method of claim 1, wherein determining each performance metric for a communications channel comprises:
   determining a window comprising a data quantity received prior to the first and second segments;
   accessing a plurality of previous segments received on the communications channel during the window, each of the plurality of previous segments including one or more errors;
   counting the errors from the plurality of previous segments; and
   determining the performance metric based on the counted errors from the plurality of previous segments received during the window.

9. The method of claim 1, wherein determining each performance metric for a communications channel comprises:
   determining a window comprising a number of data segments received prior to a received data bit;
   accessing a plurality of previous segments received on the communications channel during the window, each of the plurality of previous segments including one or more errors;

counting the errors from the plurality of previous segments received during the window; and determining the performance metric based on the counted errors from the plurality of previous segments received during the window.

10. The method of claim 1, wherein the first performance metric is based on a first transmission power level of the first communication channel, and the second performance metric is based on a second transmission power level of the second communication channel.

11. The method of claim 1, wherein the first performance metric and the second performance metric are based on a number of segments having one or more errors received within the window.

12. The method of claim 1, wherein the first performance metric and the second performance metric are based on a number of errors detected before error correction in an instantly received segment.

13. A method for receiving data comprising:
    receiving a first segment having a first data portion and a second segment having a second data portion, the second data portion being a copy of the first data portion made prior to transmission of the first data portion, the first and second segments received via at least two communication channels;
    comparing a number of errors in each of the first data portion and the second data portion to a quality threshold, the quality threshold defining an upper limit of a number of allowed errors in each portion;
    responsive to the first and second portions each having fewer errors than the quality threshold, determining a presence of at least one difference between the two portions; and
    responsive to determining the presence of the at least one difference, selecting one of the segments for continued processing based on a performance metric of the at least two communication channels.

14. The method of claim 13, further comprising responsive to selecting one of the segments for continued processing, discarding the un-selected segment.

15. The method of claim 13, wherein determining each performance metric for a communications channel comprises:

determining a time window comprising an amount of time prior to a present time;
accessing a plurality of previous segments received on the communications channel during the time window, each of the plurality of previous segments including one or more errors;
counting the errors from the plurality of previous segments received during the time window; and
determining the performance metric based on the counted errors from the plurality of previous segments received during the time window.

16. The method of claim 13, wherein determining each performance metric for a communications channel comprises:
    determining a window comprising a data quantity received prior to the first and second segments;
    accessing a plurality of previous segments received on the communications channel during the window, each of the plurality of previous segments including one or more errors;
    counting the errors from the plurality of previous segments received during the window; and
    determining the performance metric based on the counted errors from the plurality of previous segments received during the window.

17. The method of claim 13, wherein determining each performance metric for a communications channel comprises:
    determining a window comprising a number of data segments received prior to a received data bit;
    accessing a plurality of previous segments received on the communications channel during the window, each of the plurality of previous segments including one or more errors;
    counting the errors from the plurality of previous segments received during the window; and
    determining the performance metric based on the counted errors from the plurality of previous segments received during the window.

18. The method of claim 13, wherein the performance metric is based on using a transmission power level of a channel of the at least one channel.

* * * * *